(12) United States Patent
Aiba

(10) Patent No.: US 9,392,224 B2
(45) Date of Patent: Jul. 12, 2016

(54) MULTIPOINT CONNECTION APPARATUS AND COMMUNICATION SYSTEM

(75) Inventor: Akihito Aiba, Kanagawa (JP)

(73) Assignee: RICOH COMPANY, LIMITED, Tokyo (JP)

( * ) Notice: Subject to any disclaimer, the term of this patent is extended or adjusted under 35 U.S.C. 154(b) by 160 days.

(21) Appl. No.: 14/131,142

(22) PCT Filed: Jul. 10, 2012

(86) PCT No.: PCT/JP2012/068039
§ 371 (c)(1),
(2), (4) Date: Jan. 6, 2014

(87) PCT Pub. No.: WO2013/008941
PCT Pub. Date: Jan. 17, 2013

(65) Prior Publication Data
US 2014/0139611 A1  May 22, 2014

(30) Foreign Application Priority Data
Jul. 14, 2011  (JP) ................. 2011-155690

(51) Int. Cl.
*H04N 7/14* (2006.01)
*H04N 7/15* (2006.01)
*H04M 3/56* (2006.01)
*H04L 12/18* (2006.01)

(52) U.S. Cl.
CPC ............ *H04N 7/152* (2013.01); *H04L 12/1827* (2013.01); *H04M 3/567* (2013.01); *H04M 3/569* (2013.01); *H04M 2201/38* (2013.01); *H04M 2201/50* (2013.01)

(58) Field of Classification Search
CPC ...................................................... H04N 7/14
USPC ................. 348/14.01, 14.03, 14.07, 14.09
See application file for complete search history.

(56) References Cited

U.S. PATENT DOCUMENTS 5,539,741 A * 7/1996 Barraclough ....... H04L 12/1813
 348/14.07
7,499,969 B1 * 3/2009 van Os et al. .................. 709/203
(Continued)

FOREIGN PATENT DOCUMENTS

JP  9-009229  1/1997
JP  3085317  7/2000
(Continued)

OTHER PUBLICATIONS

Office Action issued Apr. 24, 2015 in Korean Patent Application No. 10-2013-7033755 (with English language translation).
(Continued)

*Primary Examiner* — Olisa Anwah
(74) *Attorney, Agent, or Firm* — Oblon, McClelland, Maier & Neustadt, L.L.P.

(57) ABSTRACT

A multipoint connection apparatus (200) includes a video/audio-signal receiving unit (201) that receives video/audio signals from video/audio terminals (100); a volume-level calculating unit (205) that calculates volume levels from the video/audio signals; a volume-display-image generating unit (207) that generates volume display images indicating volume from the volume levels; a layout-setting-information receiving unit (209) that receives layout setting information indicating information about arrangement of videos to be displayed on the video/audio terminal (100); a combined-video/audio-signal generating unit (211) that generates a combined video/audio signal by combining the video/audio signals and the volume display images based on the layout setting information; and a transmitting unit (215) that transmits the video/audio signal to the video/audio terminal (100).

8 Claims, 13 Drawing Sheets

(56) References Cited

U.S. PATENT DOCUMENTS

| | | | |
|---|---|---|---|
| 2006/0245377 A1* | 11/2006 | Jeong | H04Q 3/0045 370/260 |
| 2006/0248210 A1 | 11/2006 | Kenoyer | |
| 2009/0309897 A1 | 12/2009 | Morita et al. | |
| 2010/0002069 A1* | 1/2010 | Eleftheriadis | H04N 7/152 348/14.08 |
| 2012/0163610 A1 | 6/2012 | Sakagami | |

FOREIGN PATENT DOCUMENTS

| | | |
|---|---|---|
| JP | 3449772 | 7/2003 |
| JP | 2004-186870 | 7/2004 |
| JP | 2007-013764 | 1/2007 |
| JP | 2007-036400 | 2/2007 |
| JP | 2009-065336 | 3/2009 |
| JP | 2010-103853 | 5/2010 |
| JP | 2012-147420 | 8/2012 |
| KR | 10-2008-0098806 A | 11/2008 |
| WO | WO 2006/116644 A2 | 11/2006 |
| WO | WO 2007/103412 A2 | 9/2007 |

OTHER PUBLICATIONS

The Extended European Search Report issued Nov. 20, 2014, in application No. / patent No. 12810881.8-1905 / 2732622.
International Search Report Issued Aug. 7, 2012 in PCT/JP2012/068039 filed Jul. 10, 2012.

* cited by examiner

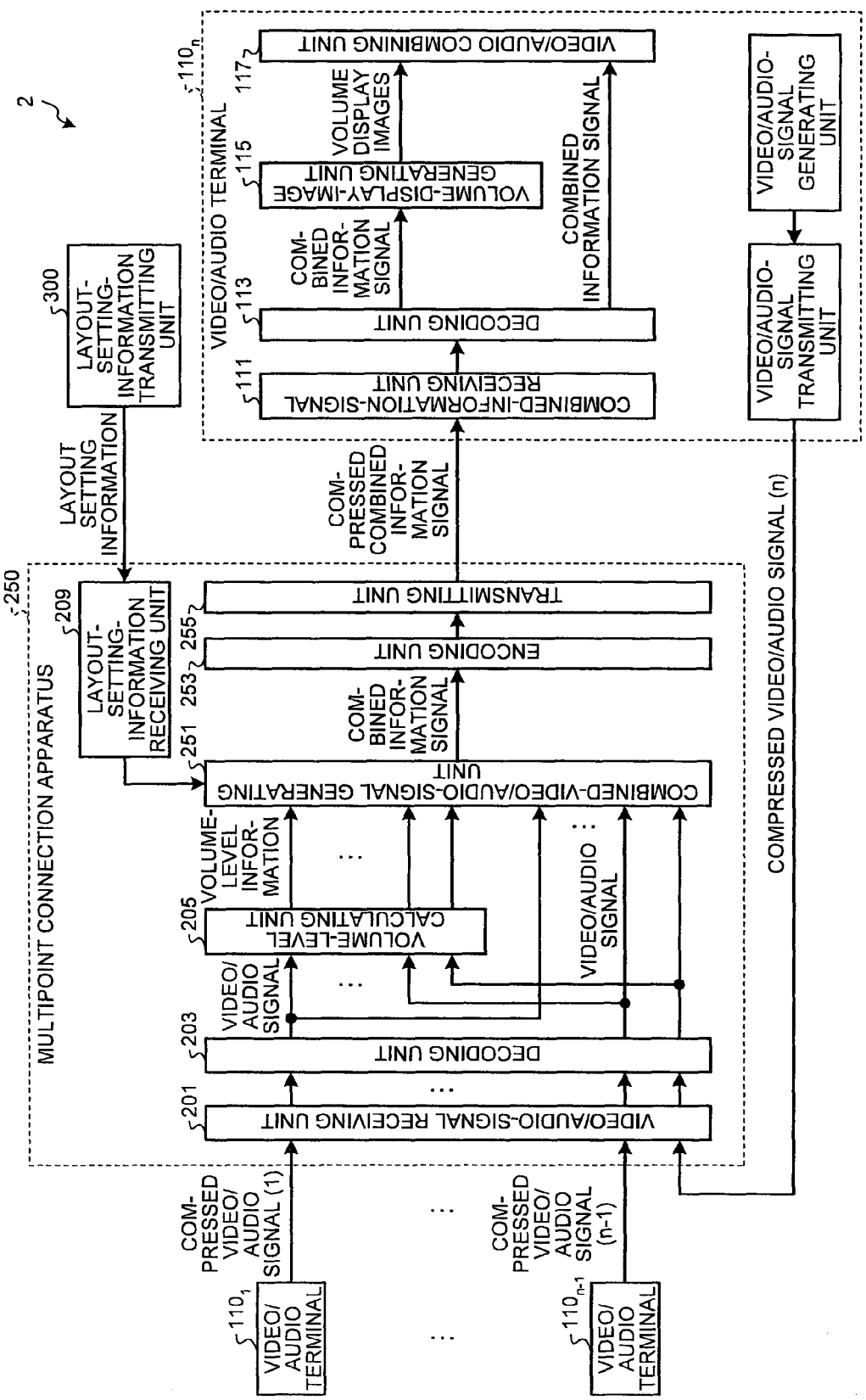

FIG.10A

| TERMINAL NUMBER | VOLUME LEVEL | LAYOUT SETTING |
|---|---|---|
| 1 | VOLUME LEVEL AT POINT #1 | LAYOUT POSITIONAL INFORMATION ABOUT POINT #1 |
| 2 | VOLUME LEVEL AT POINT #2 | LAYOUT POSITIONAL INFORMATION ABOUT POINT #2 |
| 3 | VOLUME LEVEL AT POINT #3 | LAYOUT POSITIONAL INFORMATION ABOUT POINT #3 |

FIG.10B

| TERMINAL NUMBER | VOLUME LEVEL | LAYOUT SETTING |
|---|---|---|
| 1 | 7 | (160, 560, 320, 620) |
| 2 | 3 | (800, 560, 960, 620) |
| 3 | 2 | (-1, -1, -1, -1) |

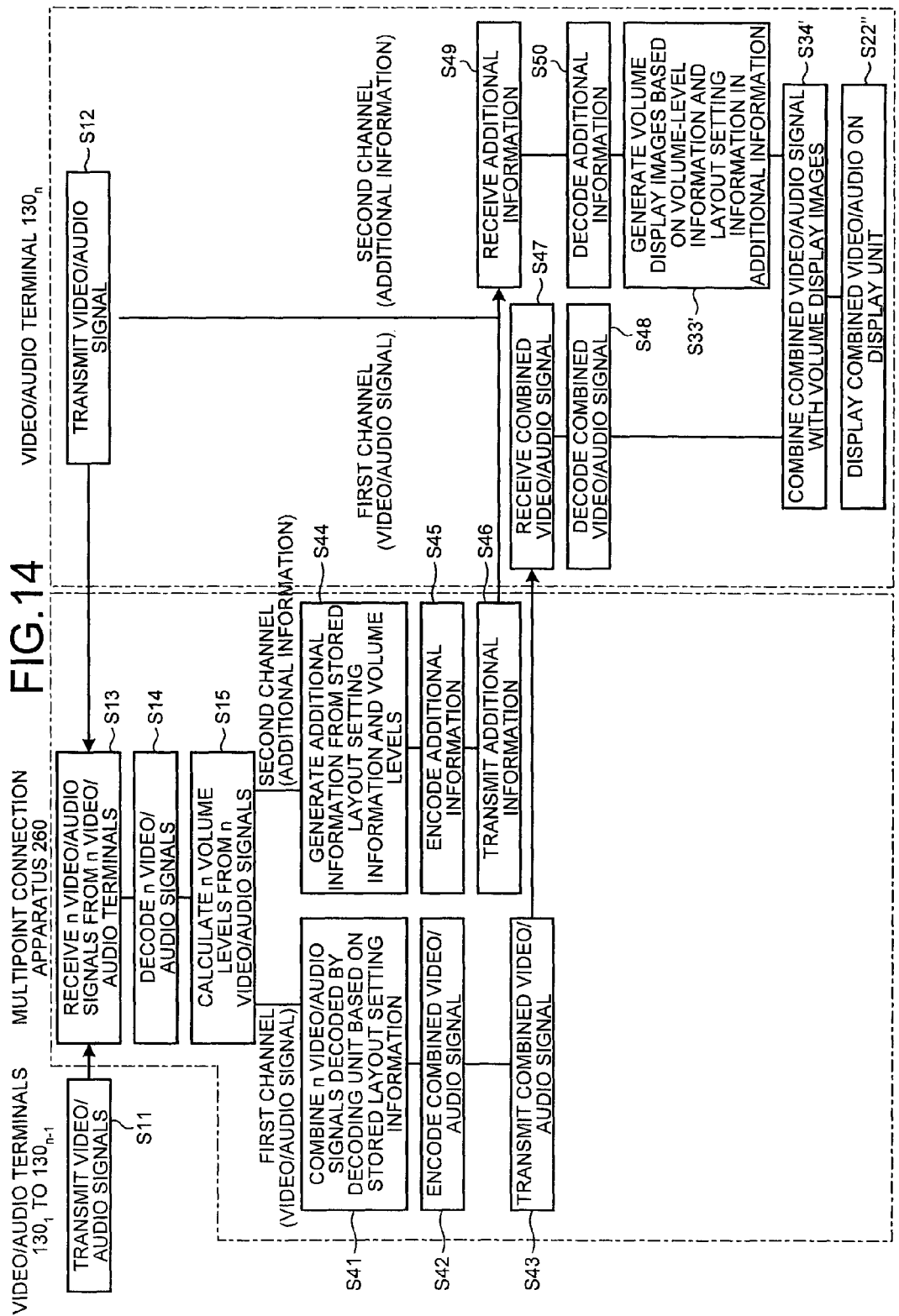

MULTIPOINT CONNECTION APPARATUS AND COMMUNICATION SYSTEM

TECHNICAL FIELD

The present invention relates to a multipoint connection apparatus and a communication system.

BACKGROUND ART

Video conference systems for exchanging video, audio, and the like with another party at a remote site have become proliferated in recent years along with development of networks and the like.

Video conference systems have a problem that a speaker has feelings of anxiety during speech because it is difficult to determine whether the speaker's voice is carried to the other party at appropriate volume. Solutions to this problem include a method of displaying a level meter or the like indicating volume of the speaker's voice on a screen.

For example, disclosed in Japanese Patent Application Laid-open No. 2004-186870 is a configuration in which a local terminal, which is a terminal at a local site, receives information about speaker volume (a volume level of output audio) of a remote terminal transmitted from the remote terminal installed at a remote site, displays the information on a screen, and also displays microphone volume (a volume level of input audio) and speaker volume of the local terminal on the screen.

Disclosed in Japanese Patent Application Laid-open No. H7-226800 is a configuration in which speaker-volume setting information about a remote terminal is transmitted to a local terminal.

However, the configurations disclosed in Japanese Patent Application Laid-open No. 2004-186870 and Japanese Patent Application Laid-open No. H7-226800 have a problem that when the remote terminal is different in configuration from the local terminal, the speaker-volume information about the remote terminal cannot be acquired from the remote side. Put another way, there is a problem that they are applicable only when the remote terminal and the local terminal are similar in configuration.

Therefore, there is a need for a multipoint connection apparatus that allows each of video/audio terminals to display microphone volume of the points separately, and a communication system.

DISCLOSURE OF INVENTION

It is an object of the present invention to at least partially solve the problems in the conventional technology.

According to an embodiment, there is provided a multipoint connection apparatus connected to a plurality of video/audio terminals. The multipoint connection apparatus includes a video/audio-signal receiving unit configured to receive video/audio signals output from the video/audio terminals, respectively; a volume-level calculating unit configured to calculate volume levels from the respective video/audio signals; a volume-display-image generating unit configured to generate volume display images indicating volume based on the respective volume levels calculated by the volume-level calculating unit; a layout-setting-information receiving unit configured to receive pieces of layout setting information, each indicating information about arrangement of videos to be displayed on the corresponding video/audio terminal; a combined-video/audio-signal generating unit configured to generate a combined video/audio signal for each of the video/audio terminals by combining the video/audio signals and the volume display images based on the piece of layout setting information for the corresponding video/audio terminal; and a transmitting unit configured to transmit the combined video/audio signal to the corresponding video/audio terminal.

According to another embodiment, there is provided a multipoint connection apparatus connected to a plurality of video/audio terminals. The multipoint connection apparatus includes a video/audio-signal receiving unit configured to receive video/audio signals output from the video/audio terminals, respectively; a volume-level calculating unit configured to calculate volume levels from the respective video/audio signals; a layout-setting-information receiving unit configured to receive pieces of layout setting information, each indicating information about arrangement of videos to be displayed on the corresponding video/audio terminal; a combined-information-signal generating unit configured to generate a combined information signal for each of the video/audio terminals from the video audio signals, the volume levels, and the piece of layout setting information for the corresponding video/audio terminal; and a transmitting unit configured to transmit the combined information signal to the corresponding video/audio terminal.

According to still another embodiment, there is provided a communication system that includes a multipoint connection apparatus; and a plurality of video/audio terminals, the multipoint connection apparatus and the video/audio terminals being connected to each other via a communication network. The multipoint connection apparatus includes a video/audio-signal receiving unit configured to receive video/audio signals output from the video/audio terminals, respectively; a volume-level calculating unit configured to calculate volume levels from the respective video/audio signals; a layout-setting-information receiving unit configured to receive pieces of layout setting information, each indicating information about arrangement of videos to be displayed on the corresponding video/audio terminal; a combined-information-signal generating unit configured to generate a combined information signal for at least one of the video/audio terminals from the video audio signals, the volume levels, and the piece of layout setting information for the corresponding video/audio terminal; and a transmitting unit configured to transmit the combined information signal to the corresponding video/audio terminal. The at least one of the video/audio terminals includes a combined-information-signal receiving unit configured to receive the combined information signal; a volume-display-image generating unit configured to generate volume display images indicating volume from the volume levels and the piece of layout setting information contained in the combined information signal; and a video/audio combining unit configured to combine the video/audio signals contained in the combined information signal with the volume display images.

The above and other objects, features, advantages and technical and industrial significance of this invention will be better understood by reading the following detailed description of presently preferred embodiments of the invention, when considered in connection with the accompanying drawings.

BRIEF DESCRIPTION OF DRAWINGS

FIG. 9 is a block diagram illustrating the configuration of a communication system according to a second embodiment;

FIGS. 10A and 10B are diagrams of a data structure of additional information according to the second embodiment;

FIG. 14 is a sequence chart diagram illustrating operations of the communication system according to the third embodiment.

BEST MODE(S) FOR CARRYING OUT THE INVENTION

First Embodiment

Figure 1:
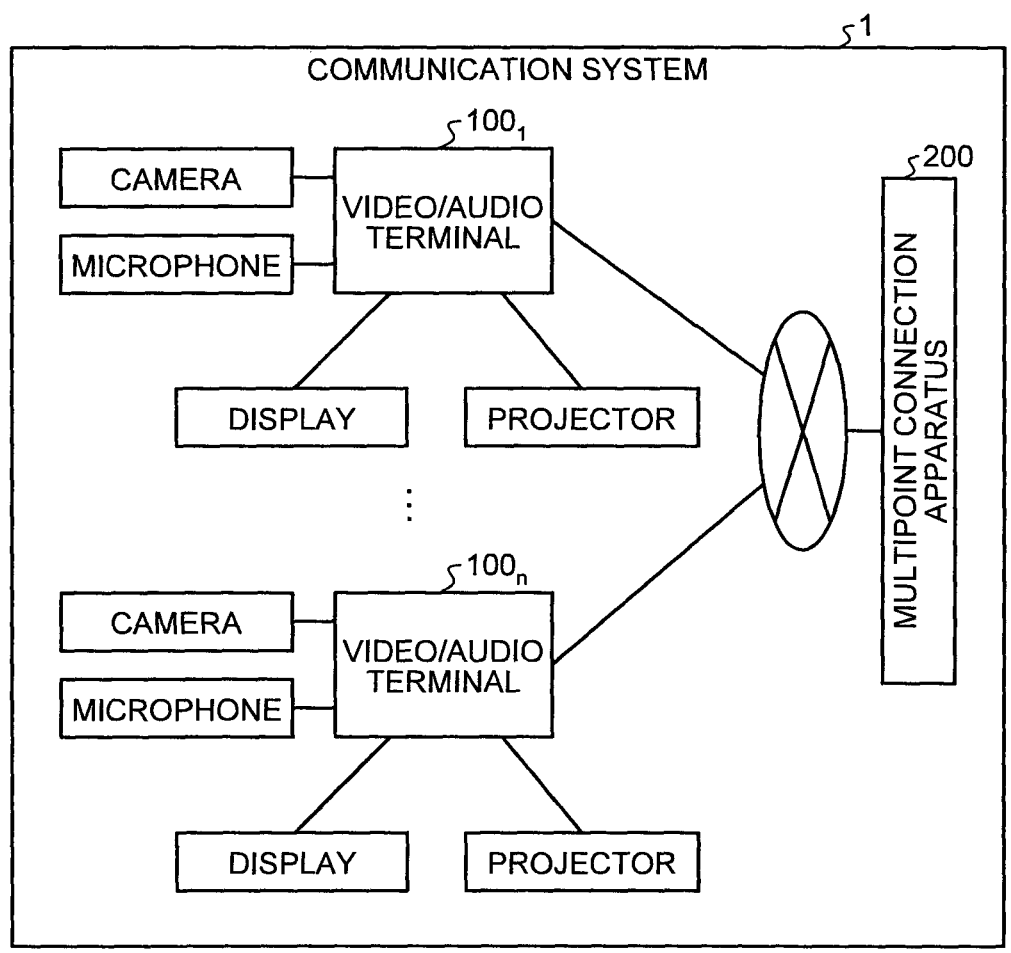
FIG. 1 is an overall configuration diagram of a communication system to which the present invention is applied.
Figure 2:
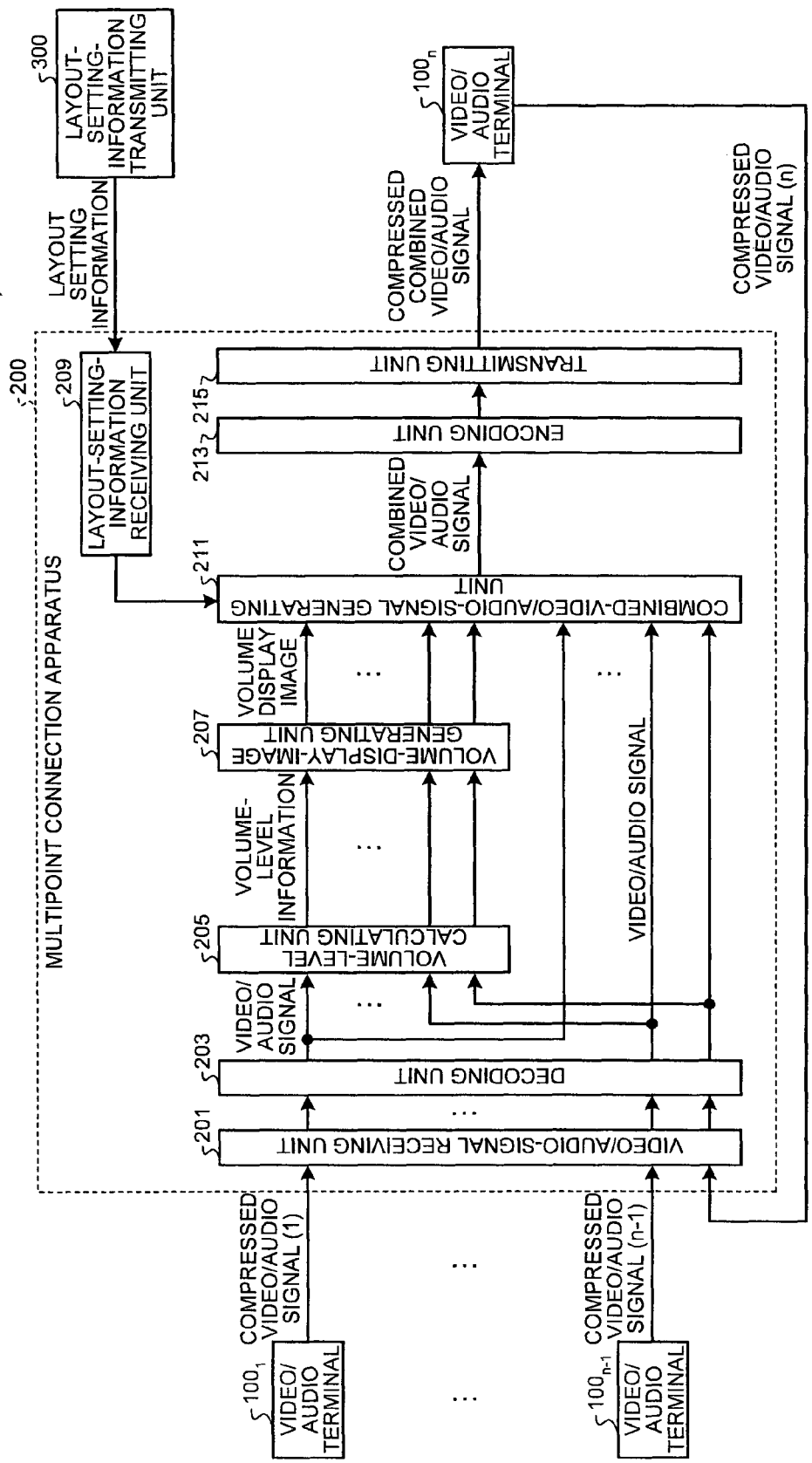
FIG. 2 is a block diagram illustrating the configuration of a communication system according to a first embodiment.

A first embodiment according to the present invention is explained with reference to FIGS. 1 and 2. FIG. 1 is an overall configuration diagram of a communication system to which the present invention is applied. FIG. 2 is a block diagram illustrating the configuration of a communication system according to the first embodiment. The present embodiment is characterized in that a multipoint connection apparatus includes a volume-level calculating unit upstream of a combined-video/audio-signal generating unit.

A communication system 1 includes a plurality of video/audio terminals $100_1$ to $100_n$ and a multipoint connection apparatus 200 that relays video/audio signals and various types of information to be transmitted and received by the video/audio terminals $100_1$ to $100_n$. The video/audio terminals $100_1$ to $100_n$ and the multipoint connection apparatus 200 are connected to each other via a communication network. Hereinafter, any one of the video/audio terminals $100_1$ to $100_n$ is simply referred to as the "video/audio terminal 100". In addition, a layout-setting-information transmitting unit 300 is connected to the multipoint connection apparatus 200 via the communication network. The layout-setting-information transmitting unit 300 is a unit that transmits layout setting information which is information about video layouts and information to be displayed on display units of the video/audio terminals 100 to the multipoint connection apparatus 200.

Connected to the illustrated multipoint connection apparatus 200 are the n (n is any number equal to or greater than two) video/audio terminals $100_1$ to $100_n$. As illustrated in FIG. 1, each of the video/audio terminals 100 includes a camera (capturing unit) that captures video of each point, a microphone (audio input unit) that receives input of audio during a conference and converts the audio into electrical signals, and a display, a projector, or the like (display unit) that displays video from the points and the like. FIG. 2 illustrates a case where the video/audio terminals $100_1$ to $100_{n-1}$ serve as sender terminals that transmit video and audio, and the video/audio terminal $100_n$ serves as a receiver terminal that receives the video and audio transmitted from the video/audio terminals $100_1$ to $100_{n-1}$.

The multipoint connection apparatus 200 includes a video/audio-signal receiving unit 201, a decoding unit 203, a volume-level calculating unit 205, a volume-display-image generating unit 207, a layout-setting-information receiving unit 209, a combined-video/audio-signal generating unit 211, an encoding unit 213, and a transmitting unit 215.

The video/audio-signal receiving unit 201 receives video/audio signals transmitted from the video/audio terminals $100_1$ to $100_n$. Meanwhile, the video/audio signals in a compressed state are generally transmitted from the video/audio terminals 100.

Figure 3:
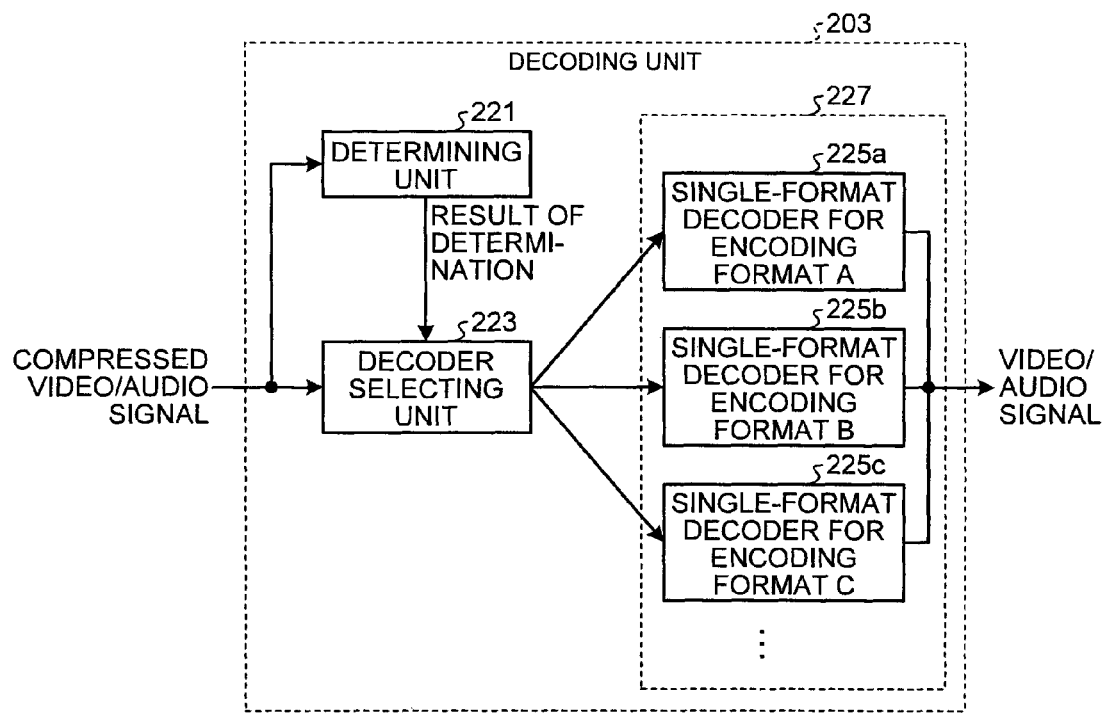
FIG. 3 is a block diagram illustrating an internal configuration of a decoding unit according to the first embodiment.

The decoding unit 203 decodes each of the compressed video/audio signals received by the video/audio-signal receiving unit 201. An example of the decoding unit 203 is explained below. FIG. 3 is a block diagram illustrating an internal configuration of a decoding unit according to the first embodiment. The decoding unit 203 may have such a configuration as illustrated in FIG. 3 so as to be capable of supporting a plurality of encoding formats.

The decoding unit 203 includes a determining unit 221, a decoder selecting unit 223, and a single-format decoder group 227 that includes a plurality of single-format decoders 225a, 225b, 225c, . . . . The determining unit 221 determines the encoding format of the compressed video/audio signal and outputs a result of the determination to the decoder selecting unit 223. The decoder selecting unit 223 outputs the compressed video/audio signal to one single-format decoder selected from the single-format decoders 225a, 225b, 225c, . . . based on the result of the determination output from the determining unit 221. The selected single-format decoder decodes the compressed video/audio signal input thereto and outputs a video/audio signal.

Figure 4:
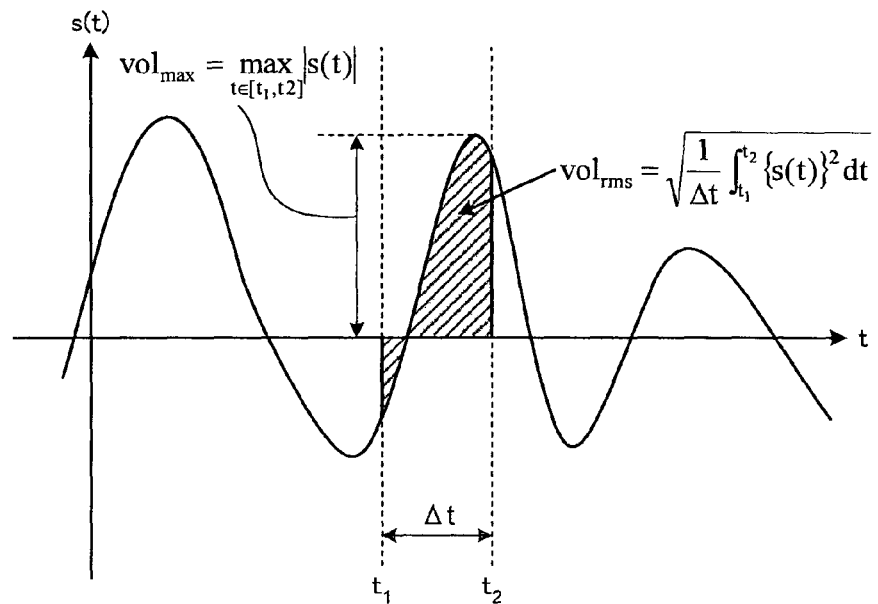
FIG. 4 is a diagram illustrating a method for calculating a volume level from a video/audio signal according to the first embodiment.

The volume-level calculating unit 205 (FIG. 2) calculates volume levels each respectively from one of the video/audio signals decoded by the decoding unit 203 and outputs the volume levels as volume-level information. There are a variety of methods for calculating the volume levels. Examples of the method include calculation using maximum amplitude or RMS of an audio signal in a unit time. The "maximum amplitude" denotes an absolute maximum value of signal values in a certain period. The "RMS" denotes root mean square of signal values in a certain period. FIG. 4 is a diagram illustrating a method for calculating a volume level from a video/audio signal according to the first embodiment.

An example case where an audio signal changes with time as illustrated in FIG. 4, in which s(t) represents an audio signal and Δt represents a unit time, is discussed below. A volume level $vol_{max}$ can be calculated using the maximum amplitude using the following equation.

$$vol_{max} = \max_{t \in [t_1, t_2]} |s(t)|$$

A volume level $vol_{rms}$ can be calculated using the RMS using the following equation.

$$vol_{rms} = \sqrt{\frac{1}{\Delta t}\int_{t_1}^{t_2} \{S(t)\}^2\, dt}$$

Meanwhile, the volume level is not necessarily actual maximum amplitude. For example, a method of outputting a volume level that is normalized and quantized to an integer in a predetermined range, for example, from 0 to 10 in decibel value in such a manner that 0 corresponds to a silent state and 10 corresponds to a 0–dB state. The "normalization" means transforming data according to a certain rule to make the data more usable.

Figure 5A:
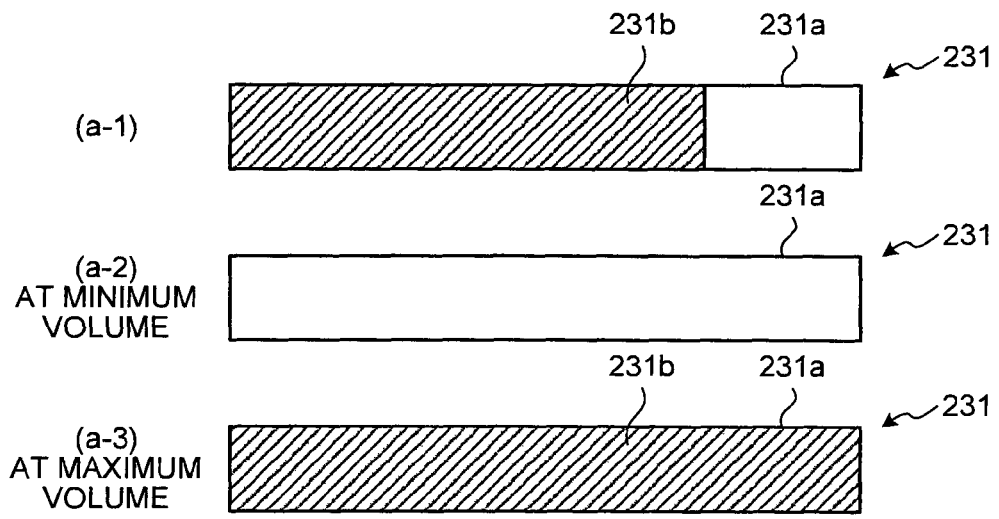
FIGS. 5A and 5B are diagrams of volume display images generated by a volume-display-image generating unit according to the first embodiment.
Figure 5B:
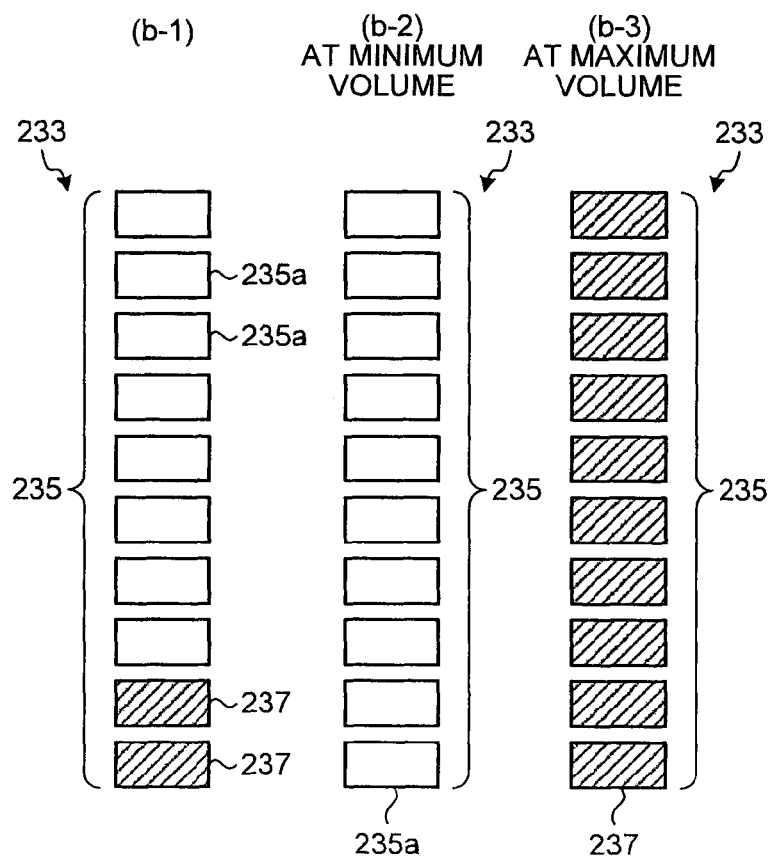

The volume-display-image generating unit 207 (FIG. 2) generates volume display images based on the volume-level information output from the volume-level calculating unit 205. FIGS. 5A and 5B are diagrams of volume display images generated by a volume-display-image generating unit according to the first embodiment.

For example, in FIG. 5A, a volume display image 231 is formed from a volume display area 231*a* which is a laterally-elongated rectangle and a bar 231*b* displayed in the volume display area 231*a*. The volume display area 231*a* is displayed in a predetermined base color. The bar 231*b* contacts the volume display area 231*a* on at least three sides and is displayed in a color different from the base color of the volume display area 231*a*. Volume is expressed as an area of the bar 231*b* in the volume display area 231*a*. More specifically, volume is expressed by assigning the different color only to a portion, of which area depends on the volume level, of the volume display area 231*a*. For example, as illustrated in (a-2), the area of the bar 231*b* is zero at minimum volume, and only the volume display area 231*a* is displayed. As illustrated in (a-3), the area of the bar 231*b* is maximized at maximum volume, and the entire volume display area 231*a* becomes the bar 231*b*.

In FIG. 5B, a volume display image 233 is formed from a volume display area 235 (segment bar graph), which is formed from a plurality of segment bars 235*a* arranged in one vertical line, and colored segment bars 237 that represent volume. Each of the segment bars 235*a* is displayed in a predetermined base color. The segment bars 237 are some of the segment bars 235*a* in the volume display area 235 filled with a color different from the base color. In FIG. 5B, volume is expressed as the number of the segment bars 237. More specifically, volume is expressed by assigning the different color only to the segment bars 235*a*, of which number depends on the volume level, of the volume display area 235. For example, as illustrated in (b-2), the number of the segment bars 237 is zero at minimum volume. As illustrated in (b-3), all of the segment bars 235*a* in the volume display area 235 become the segment bars 237 at maximum volume.

Meanwhile, any other image than those of the examples given in FIGS. 5A and 5B can be employed so long as the image allow visual recognition of volume. For example, another shape, such as an elliptical shape, a circular shape, or a triangular shape, than the rectangular shape can be employed.

The layout-setting-information receiving unit 209 (FIG. 2) receives the layout setting information transmitted from the layout-setting-information transmitting unit 300. Meanwhile, the layout setting information is information indicating information about arrangement of videos. More specifically, the layout setting information is information indicating in what layout, or arrangement, the videos of the video/audio terminals $100_1$ to $100_n$ are to be displayed. Meanwhile, the layout-setting-information transmitting unit 300 is generally incorporated in the video/audio terminal $100_n$ and configured such that layout setting can be selected and specified by a user of the video/audio terminal $100_n$ as desired using an operating button or the like of the video/audio terminal $100_n$.

Figure 6A:
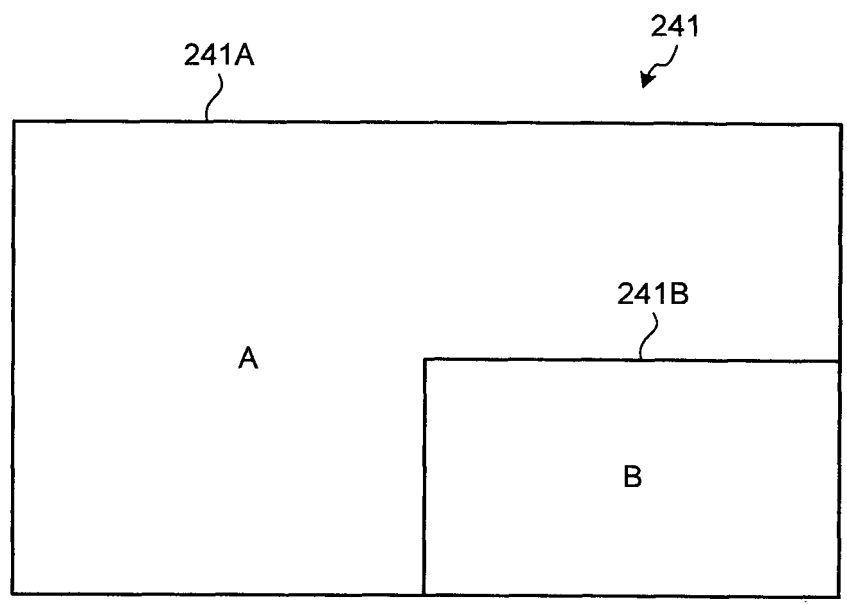
FIGS. 6A and 6B are diagrams of video layouts according to the first embodiment.
Figure 6B:
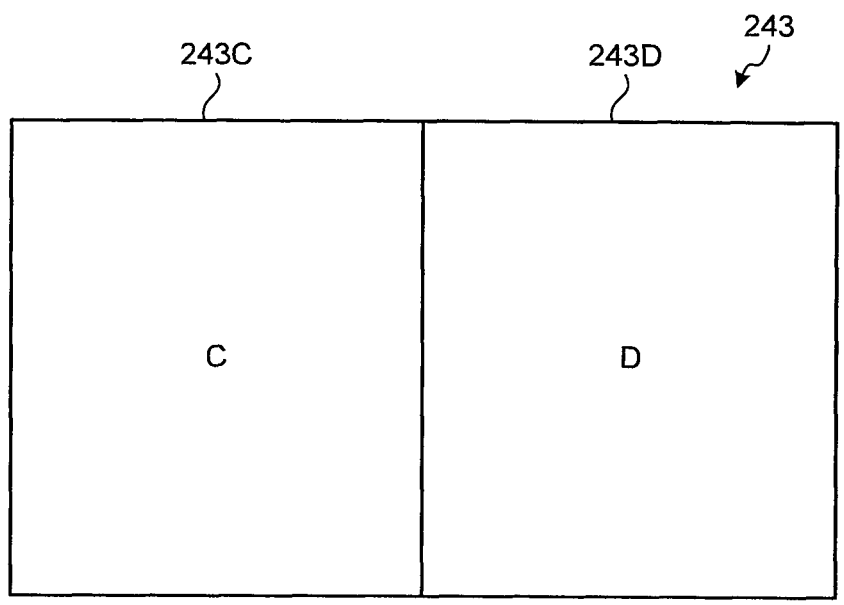

FIGS. 6A and 6B are diagrams of video layouts according to the first embodiment. Examples where videos at two points are displayed on one screen are illustrated. More specifically, the examples are of a case where a video at a local point and a video at a remote point in a conference between two points are displayed and a case where videos at two remote points in a conference among three points are displayed.

A display screen 241 illustrated in FIG. 6A is an example of a layout of an area 241A dominating the entire screen and an area 241B that is displayed as being overlaid on the area 241A and smaller than the area 241A. A video at a certain point is displayed on the area 241A, while a video at another point is displayed on the area 241B. In FIG. 6A, the area 241B is displayed as being overlaid on a bottom right portion of the area 241A; however, a position where the area 241B is to be displayed is not limited thereto. A similar layout in which, for example, the area 241B is arranged at bottom left, top left, or top right can be employed.

A display screen 243 illustrated in FIG. 6B is an example layout in which a screen is vertically divided into two parts with an area 243C on the left and an area 243D on the right. A video at a certain point is displayed on the area 243C, while a video at another point is displayed on the area 243D. Examples of a similar layout include that in which a top portion and a bottom portion of each of the areas 243C and 243D are blanked to maintain an aspect ratio of videos to be displayed.

As a matter of course, a video layout other than the examples illustrated in FIGS. 6A and 6B may be employed.

Figure 7A:
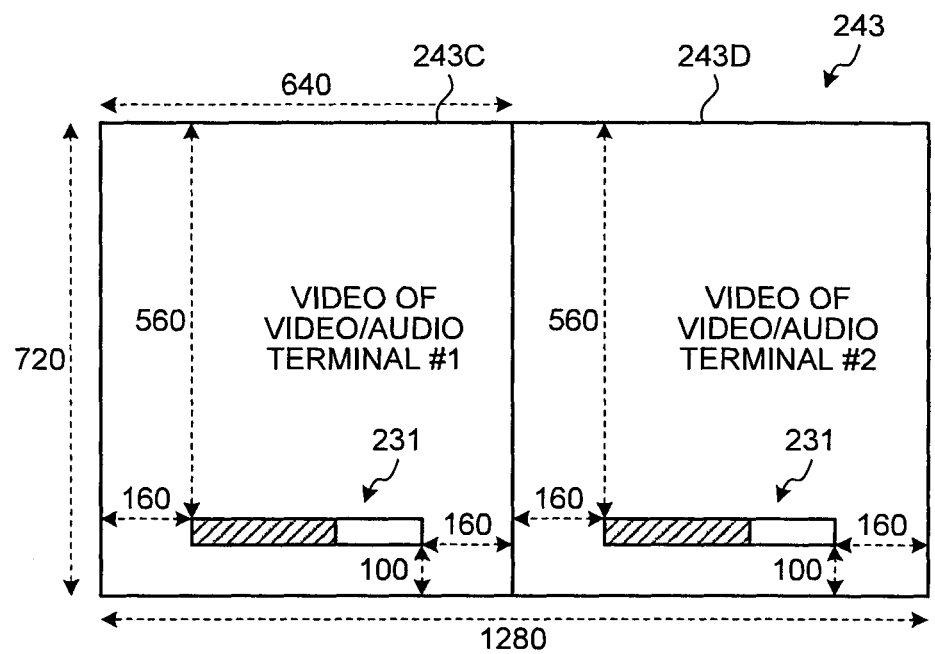
FIGS. 7A and 7B are diagrams of videos combined by a combined-video/audio-signal generating unit according to the first embodiment.
Figure 7B:
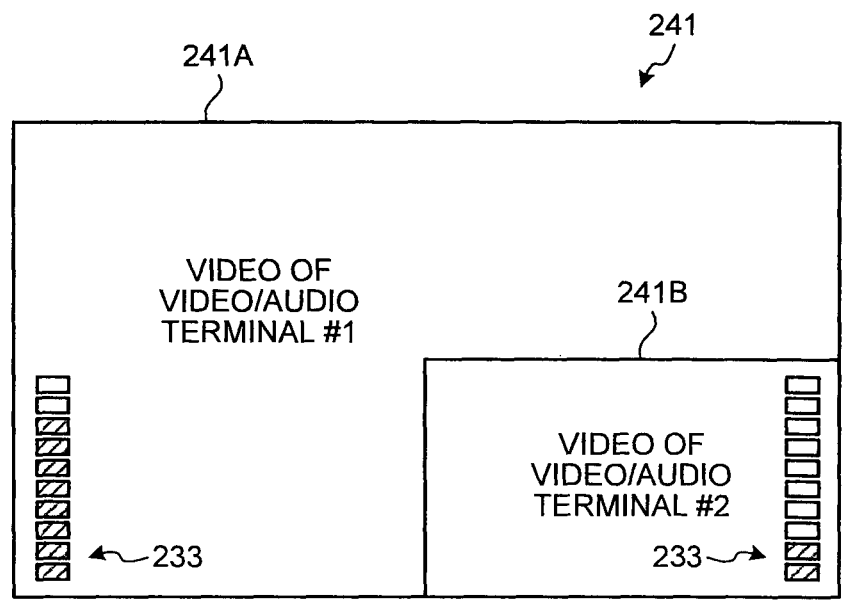

The combined-video/audio-signal generating unit 211 (FIG. 2) combines the video/audio signals decoded by the decoding unit 203 with the volume display images generated by the volume-display-image generating unit 207 based on the layout setting information received by the layout-setting-information receiving unit 209. The combined video/audio signal is a signal into which at least video/audio signals from a plurality of video/audio terminals are combined. The combined video/audio signal according to the present embodiment is obtained by combining not only the video/audio signals but also the volume display images. FIGS. 7A and 7B are diagrams of videos combined by a combined-video/audio-signal generating unit according to the first embodiment.

The combined video illustrated in FIG. 7A is an example in which layout setting information corresponding to the layout illustrated in FIG. 6B is received and such a volume display image as illustrated in FIG. 5A is used, for example. The volume display images 231 are displayed in lower portions of the area 243C and the area 243D on the display screen 243.

Similarly, the combined video illustrated in FIG. 7B is an example in which layout setting information corresponding to the layout illustrated in FIG. 6A is received and such a volume display image as illustrated in FIG. 5B is used, for example. The volume display images 233 are displayed in a left end portion of the area 241A and a right end portion of the area 241B on the display screen 243.

The encoding unit 213 (FIG. 2) encodes the combined video/audio signal output from the combined-video/audio-signal generating unit 211 to compress data size.

The transmitting unit 215 transmits the combined video/audio signal compressed by the encoding unit 213 to the video/audio terminal $100_n$.

The video/audio terminal $100_n$ outputs video that is combined based on the received combined video/audio signal as illustrated in FIG. 7A or 7B to a display unit such as a display or a projector. In practice, each of the video/audio terminals $100_1$ to $100_{n-1}$ also receives the video/audio signals from the video/audio terminals 100. Accordingly, n signals are input/output to/from the layout-setting-information receiving unit 209, the combined-video/audio-signal generating unit 211, the encoding unit 213, and the transmitting unit 215.

Figure 8A:
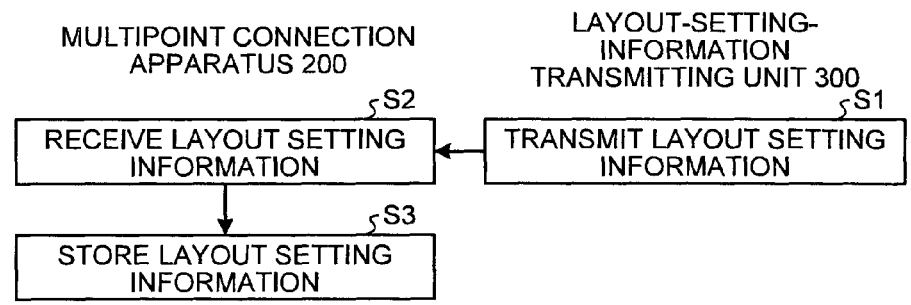
FIGS. 8A and 8B are sequence chart diagrams illustrating operations of the communication system according to the first embodiment.
Figure 8B:
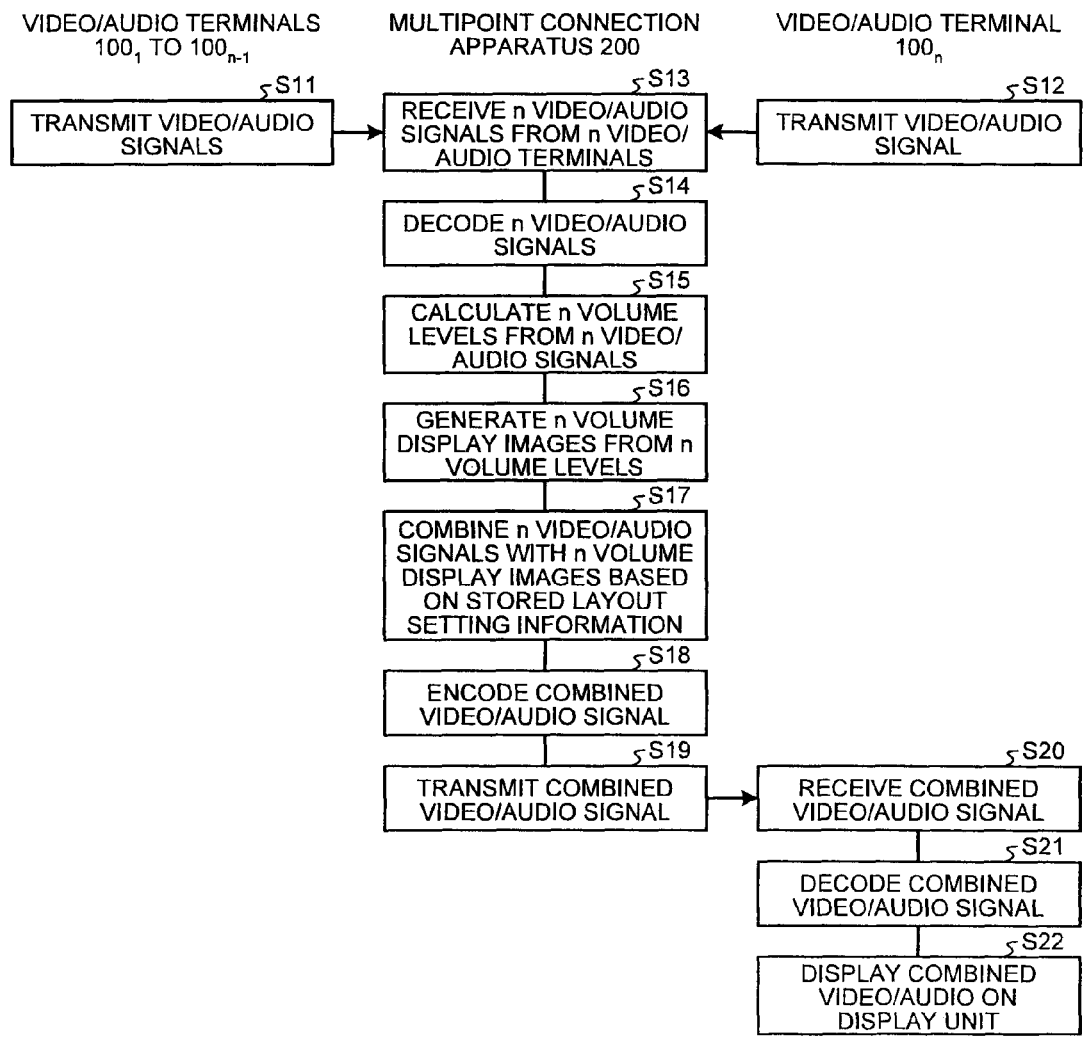

Operations of the communication system 1 are explained with reference to sequence charts. FIGS. 8A and 8B are sequence chart diagrams illustrating operations of the communication system according to the first embodiment.

First, operations related to layout setting information processing are explained with reference to FIG. 8A. The layout-setting-information transmitting unit 300 transmits layout setting information to the multipoint connection apparatus 200 (Step S1). The layout-setting-information receiving unit 209 of the multipoint connection apparatus 200 receives the layout setting information (Step S2) and stores it in a storage unit (not shown) (Step S3).

Next, operations related to video/audio processing are explained with reference to FIG. 8B.

The video/audio terminals $100_1$ to $100_n$ transmit compressed video/audio signals to the multipoint connection apparatus 200 (Steps S11 and S12).

The video/audio-signal receiving unit 201 of the multipoint connection apparatus 200 receives the n compressed video/audio signals from the video/audio terminals $100_1$ to $100_n$ (Step S13). The decoding unit 203 decodes the compressed video/audio signals into the n compressed video/audio signals (Step S14). The volume-level calculating unit 205 calculates n volume levels from the n video/audio signals decoded by the decoding unit 203 (Step S15). The volume-display-image generating unit 207 generates n volume display images from information about the n volume levels output from the volume-level calculating unit 205 (Step S16). The combined-video/audio-signal generating unit 211 retrieves the layout setting information stored at Step S3 of FIG. 8A and combines the n video/audio signals with the n volume display images (Step S17). The encoding unit 213 encodes the combined video/audio signal obtained by combining by the combined-video/audio-signal generating unit 211 (Step S18). The transmitting unit 215 transmits the compressed combined video/audio signal generated by the encoding unit 213 to the video/audio terminal $100_n$ (Step S19).

The video/audio terminal $100_n$ receives the compressed combined video/audio signal (Step S20), decodes it (Step S21), and displays the obtained video/audio signals on the display unit (Step S22).

The speaker volume of the remote terminal and the microphone volume of the local terminal are information about audio transmitted from the local site to the remote site. Not only such information as described above but also information, such as speaker volume of the local terminal and microphone volume of the remote terminal, about audio transmitted from the remote site to the local site are preferably displayed simultaneously. This permits performing adjustment of speech volume level, which is performed while viewing a volume display related to audio on the local side, based on relationship between how audio provided by a speaker is audible on the local side and volume display related to audio on the remote side, thereby facilitating the adjustment. Furthermore, it is also advantageous that at occurrence of a trouble, the information can be used as reference information for determining a cause of the trouble.

As described above, according to the present embodiment, the multipoint connection apparatus includes the volume-level calculating unit and the volume-display-image generating unit, and transmits a combined video/audio signal into which the volume display images are combined by the combined-video/audio-signal generating unit to the video/audio terminal. The video/audio terminal can receive the combined video/audio signal in which the volume display images are already contained. Therefore, the video/audio terminal which is a receiving side can display microphone volume of the other video/audio terminals individually independent of the configuration of the video/audio terminal.

Furthermore, utilizing the maximum amplitude in calculation of the volume levels permits employing appropriate values as the volume levels. Furthermore, utilizing the RMS in calculation of the volume levels permits employing easy-to-handle values as the volume levels. Furthermore, utilizing the volume levels that are normalized and quantized permits displaying volume in an intuitive and understandable manner.

Meanwhile, in the present embodiment, only receiving operations by only the video/audio terminal $100_n$ are described for convenience of explanation. However, the video/audio terminals $100_1$ to $100_{n-1}$ also receive video/audio signals in practice, and processing similar to that described above is performed.

Second Embodiment

A second embodiment according to the present invention is explained with reference to FIG. 9. FIG. 9 is a block diagram illustrating the configuration of a communication system according to the second embodiment. The present embodiment is characterized in that video/audio terminals perform generating volume display images and combining the generated volume display images with video/audio signals.

Connected to a multipoint connection apparatus 250 of a communication system 2 are n (n is any number equal to or greater than two) video/audio terminals $110_1$ to $110_n$. FIG. 9 illustrates a case where the video/audio terminal $110_n$ receives video/audio signals from the video/audio terminals $110_1$ to $110_{n-1}$. Note that terminals having the same configuration as those of the first embodiment can be used as the video/audio terminals $110_1$ to $110_{n-1}$.

The multipoint connection apparatus 250 includes the video/audio-signal receiving unit 201, the decoding unit 203, the volume-level calculating unit 205, a combined-information-signal generating unit 251, an encoding unit 253, the layout-setting-information receiving unit 209, and a transmitting unit 255. The video/audio-signal receiving unit 201, the decoding unit 203, the volume-level calculating unit 205, and the layout-setting-information receiving unit 209 are similar to corresponding units of the multipoint connection apparatus 200 of the first embodiment and designated by same reference numerals as those of the first embodiment; accordingly, description thereof is omitted.

The combined-information-signal generating unit 251 combines the video/audio signals decoded by the decoding unit 203 based on the layout setting information received by the layout-setting-information receiving unit 209. Furthermore, the combined-information-signal generating unit 251 generates a combined information signal by embedding information (volume-level information, which is additional information) about the volume levels calculated by the volume-level calculating unit 205 and the layout setting information (additional information) into the obtained combined signal. This embedding of the additional information is performed so as to reduce difference between video/audio signals obtained by decoding the combined information signal and the original video/audio signals. For example, the additional information is embedded into high-frequency components of the video/audio signals. Embedding in this way allows even an video/audio terminal that does not have a special configuration or, more specifically, even a video/audio terminal (e.g., the video/audio terminal 110) that does not include a volume-display-image generating unit 115 and a video/audio combining unit 117, which will be described later, to acquire and utilize video/audio signals, and also prevents an increase in data size.

FIGS. 10A and 10B are diagrams of a data structure of additional information according to the second embodiment. As illustrated in FIG. 10A for example, the volume-level information and the layout setting information have a data structure in which the volume-level information about the video/audio terminals is associated with the corresponding layout information. Layout positional information about each of the video/audio terminals can be expressed in, for example, XY coordinate values of a video display position. FIG. 10B illustrates an example where actual values are assigned. Values corresponding to FIG. 7A are assigned in this example. Coordinates (160, 560) and (800, 560) of a top left point and coordinates (320, 620) and (960, 620) of a bottom right point of the volume display images 231 are assigned for terminal numbers 1 and 2, respectively, as the layout setting information. Negative values in layout setting for a terminal number 3 indicate that video of the video/audio terminal to which this number is assigned is not to be displayed.

The encoding unit 253 (FIG. 9) encodes the combined information signal output from the combined-information-signal generating unit 251 to compress data size.

The transmitting unit 255 transmits the combined information signal compressed by the encoding unit 253 to the video/audio terminal $110_n$.

The video/audio terminal $110_n$ includes a combined-information-signal receiving unit 111, a decoding unit 113, the volume-display-image generating unit 115, and the video/audio combining unit 117.

The combined-information-signal receiving unit 111 receives the compressed combined information signal transmitted from the multipoint connection apparatus 250.

The decoding unit 113 decodes the compressed combined information signal.

Figure 11A:
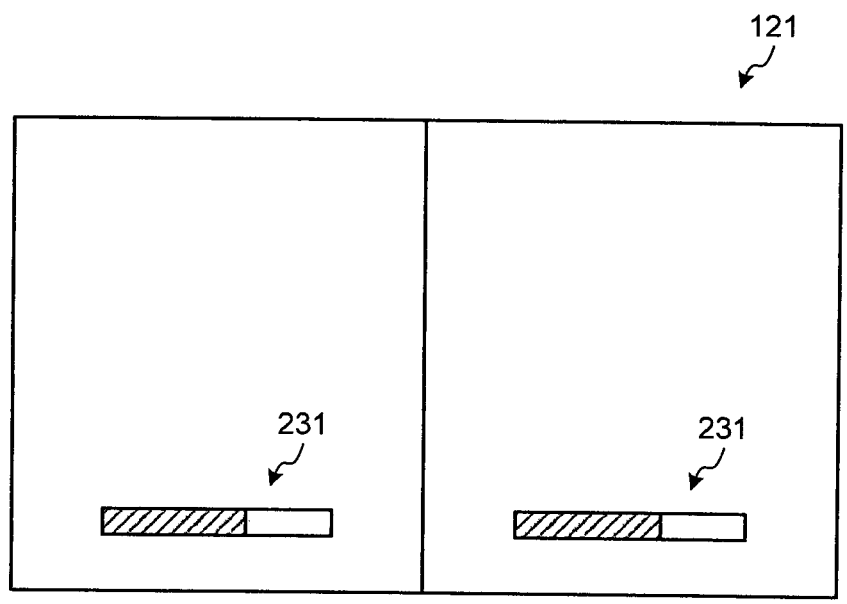
FIGS. 11A and 11B are diagrams of images combined by a combined-video/audio-signal generating unit according to the second embodiment.
Figure 11B:
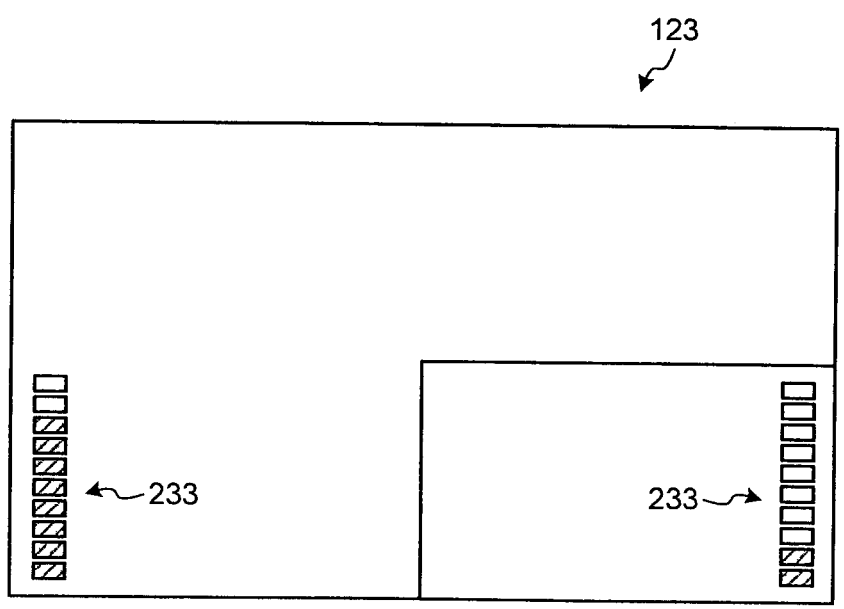

The volume-display-image generating unit 115 generates a display screen including volume display images indicating volume based on the volume-level information and the layout setting information embedded in the combined information signal. FIGS. 11A and 11B are diagrams of images combined by a combined-video/audio-signal generating unit according to the second embodiment.

The combined video illustrated in FIG. 11A is an example of an image generated with such a volume display method as illustrated in FIG. 5A and from the layout setting information corresponding to FIG. 6B, for example. The volume display images 231 that indicate volume of the video/audio terminals, to which the terminal numbers 1 and 2 are assigned, are individually displayed in a bottom portion of a display screen 121.

Similarly, the combined video illustrated in FIG. 11B is an example of an image generated with such a volume display method as illustrated in FIG. 5B and from the layout setting information corresponding to FIG. 6A, for example. The volume display images 233 that indicate volume of the video/audio terminals, to which the terminal numbers 1 and 2 are assigned, are displayed in a lower portion of a left end portion and a lower portion of a right end portion, respectively, of a display screen 123.

As a matter of course, any video other than the examples illustrated in FIGS. 11A and 11B may be obtained by combining so long as the volume levels and the display images, and the layout setting information and the display position correspond to each other.

The video/audio combining unit 117 (FIG. 9) combines the combined information signal decoded by the decoding unit 113 with the volume display images generated by the volume-display-image generating unit 115. More specifically, the video/audio combining unit 117 assumes the combined information signal that contains the volume-level information as the video/audio signals and utilizes the combined information signal as it is without performing an operation of separating only the video/audio signals from the combined information signal. For example, when the combined information signal that is assumed as the video/audio signals is combined with such volume display images as illustrated in FIG. 11A, such a video/audio signal as illustrated in FIG. 7A is obtained.

The video/audio terminal $110\text{-}n$ outputs such video as illustrated in FIGS. 7A and 7B based on the combined video/audio signal to a display unit such as a display or a projector.

Figure 12:
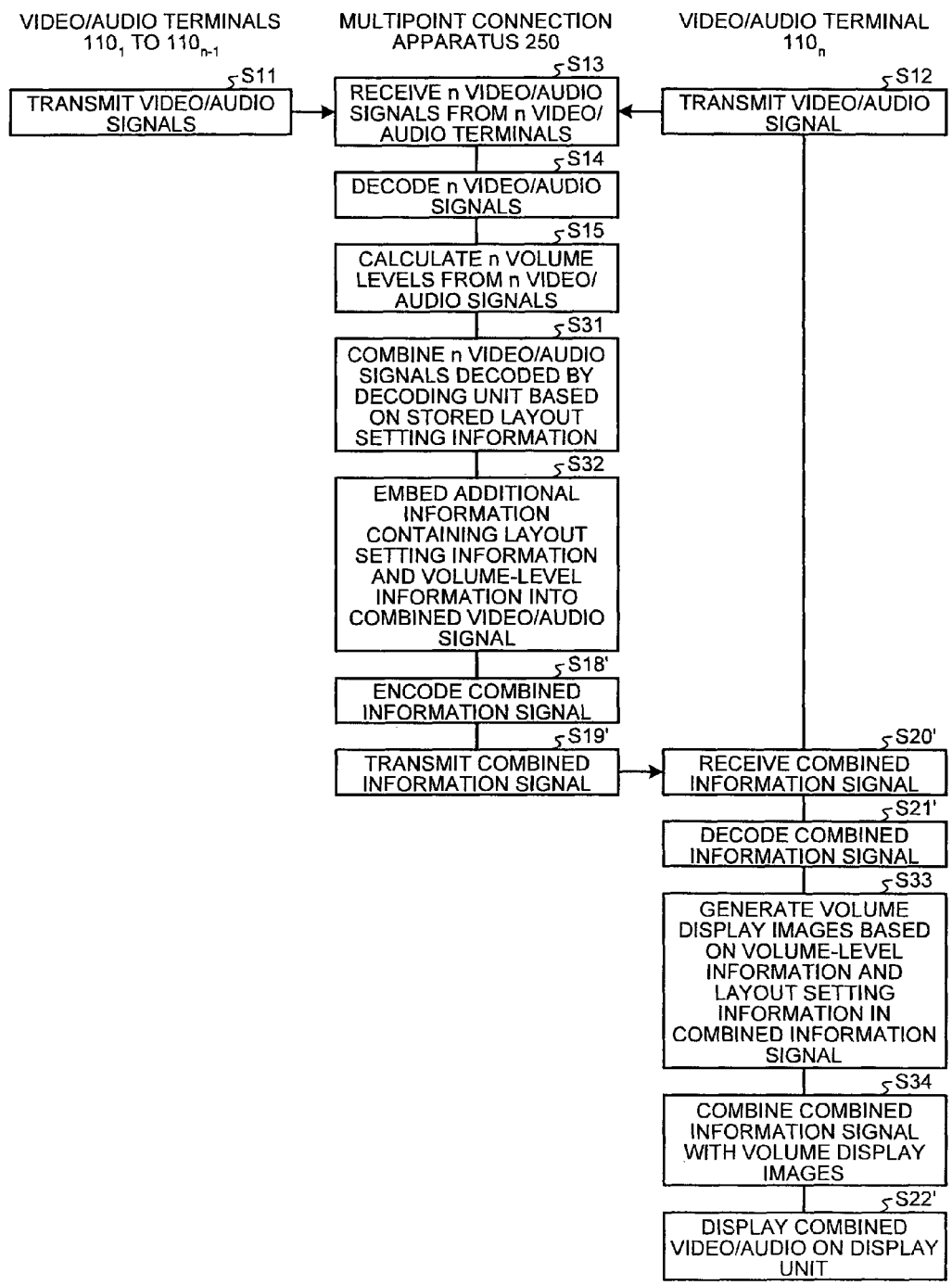
FIG. 12 is a sequence chart diagram illustrating operations of the communication system according to the second embodiment.

Operations of the communication system 2 explained above are explained with reference to a sequence chart. FIG. 12 is a sequence chart diagram illustrating the operations of the communication system according to the second embodiment. This diagram illustrates only operations related to video/audio processing. Operations related to layout setting information processing are similar to those of the first embodiment (see FIG. 8A) and description thereof is omitted. Processes similar to those of the first embodiment are designated by like step numbers and description thereof is omitted.

The video/audio terminals $110_1$ to $110_n$ transmit compressed video/audio signals to the multipoint connection apparatus 250 (Steps S11 and S12).

The multipoint connection apparatus 250 performs processing from Step S13 to Step S15.

The combined-information-signal generating unit 251 of the multipoint connection apparatus 250 retrieves the layout setting information stored at Step S3 of FIG. 8A and combines the n video/audio signals based on the layout setting information (Step S31). Furthermore, the combined-information-signal generating unit 251 generates a combined information signal by embedding additional information containing the layout setting information and the volume-level information into the video/audio signal obtained by combining (Step S32).

Encoding and transmission of the obtained combined video/audio signal are performed (Steps S18' and S19').

The combined-information-signal receiving unit 111 of the video/audio terminal $110_n$ receives the compressed combined information signal (Step S20'). The decoding unit 113 decodes the compressed combined information signal (Step S21'). The volume-display-image generating unit 115 generates volume display images based on the volume-level information and the layout setting information embedded in the decoded combined information signal (Step S33). The video/audio combining unit 117 combines the combined information signal with the volume display images (Step S34). The obtained video/audio is displayed on the display unit (Step S22').

As described above, it is possible to display microphone volume at a plurality of points individually according to the present embodiment. Furthermore, it is possible to provide the display described above irrespective of the configuration of a video/audio terminal at another point serving as a sender terminal.

Furthermore, the combined-information-signal generating unit of the multipoint connection apparatus generates a combined information signal by embedding additional information containing layout setting information and volume levels in video/audio signals, and transmits the combined information signal to the video/audio terminals. Accordingly, it is possible to transmit and receive the volume levels and the layout setting information without increasing a data size of the original video/audio signals.

In the first embodiment, each of the video/audio terminals obtain a similar video irrespective of the configuration of the video/audio terminal; however, volume display can disadvantageously become redundant in such a case where the video/audio terminal includes a volume display unit of its own or the like. However, such a situation will not occur with the second embodiment because the video/audio terminal includes the volume-display-image generating unit and the video/audio combining unit.

Third Embodiment

Figure 13:
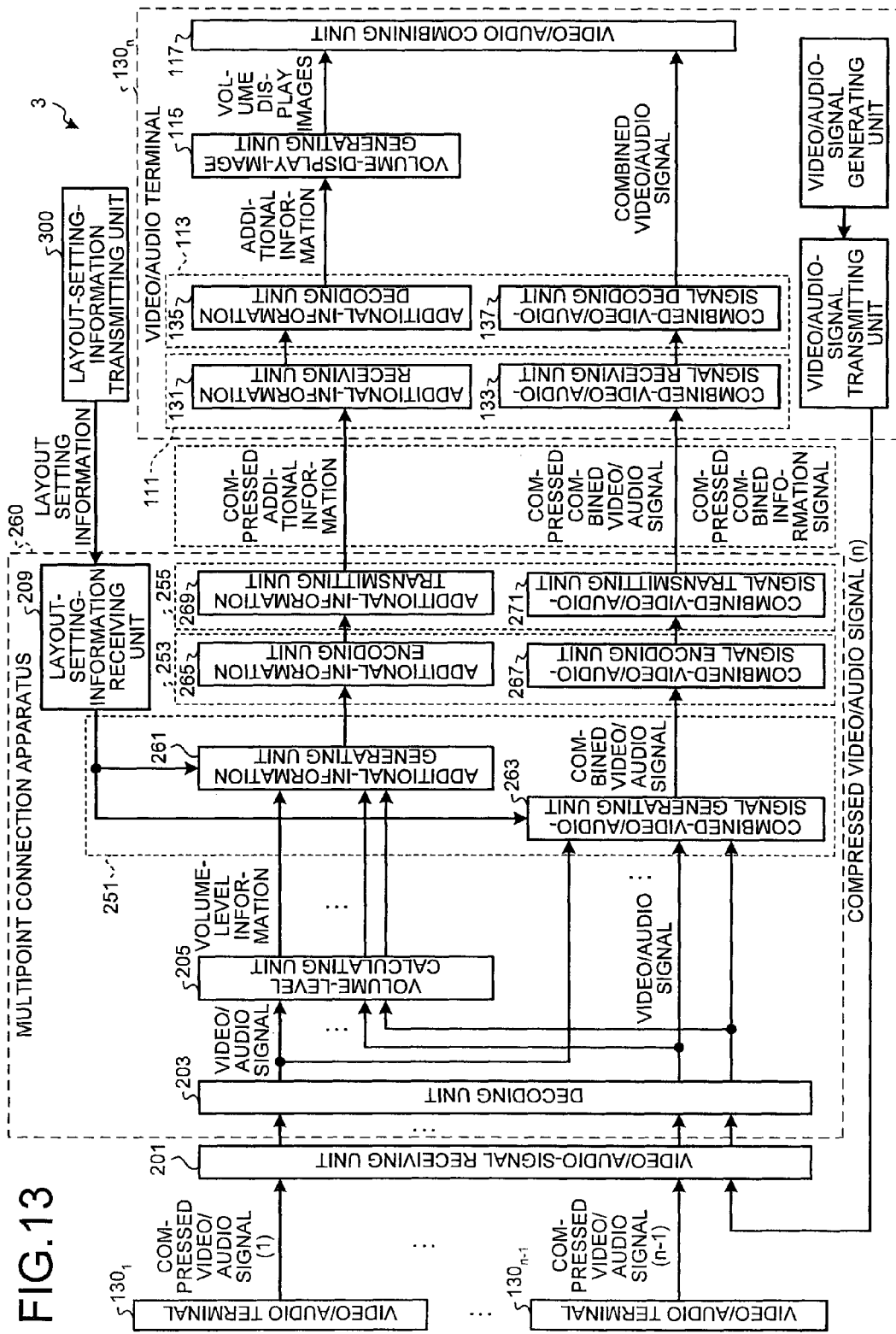
FIG. 13 is a block diagram illustrating the configuration of a communication system according to a third embodiment.

A third embodiment which is a variation of the second embodiment is explained. In the communication system 2 (FIG. 9) according to the second embodiment, the additional information made up of the volume-level information and the layout setting information is embedded in the combined information signal to transmit the volume-level information and the layout setting information to the video/audio terminal. Contrasted therewith, a configuration in which the combined video/audio signal is transmitted through a first channel and the additional information is transmitted through a second channel to the video/audio terminal rather than performing the embedding may be employed. FIG. 13 is a block diagram illustrating the configuration of a communication system according to the third embodiment. Components similar to those of the first and second embodiments are designated by like reference numerals and description thereof is omitted.

The combined-information-signal generating unit 251 of a multipoint connection apparatus 260 of a communication system 3 includes two units which are an additional-information generating unit 261 and a combined-video/audio-signal generating unit 263. The additional-information generating unit 261 generates additional information having such a data structure as illustrated in FIGS. 10A and 10B from volume levels and layout setting information. The combined-video/audio-signal generating unit 263 outputs a combined video/audio signal into which video/audio signals of video/audio terminals 130 are combined based on the layout setting information. Meanwhile, the additional information and the combined video/audio signal output from the combined-information-signal generating unit 251 according to the present invention are collectively referred to as a combined information signal.

The encoding unit 253 includes an additional-information encoding unit 265 and a combined-video/audio-signal encoding unit 267. The additional-information encoding unit 265 encodes the additional information, and the combined-video/audio-signal encoding unit 267 encodes the combined video/audio signal to compress data size.

The transmitting unit 255 includes an additional-information transmitting unit 269 and a combined-video/audio-signal transmitting unit 271. The additional-information transmitting unit 269 transmits the compressed additional information. The combined-video/audio-signal transmitting unit 271 transmits the compressed combined video/audio signal.

The combined-information-signal receiving unit 111 of the video/audio terminal 130$_n$ includes an additional-information receiving unit 131 and a combined-video/audio-signal receiving unit 133. The additional-information receiving unit 131 receives the compressed additional information. The combined-video/audio-signal receiving unit 133 receives the compressed combined video/audio signal.

The decoding unit 113 includes an additional-information decoding unit 135 and a combined-video/audio-signal decoding unit 137. The additional-information decoding unit 135 decodes the compressed additional information. The combined-video/audio-signal decoding unit 137 decodes the compressed combined video/audio signal.

Operations of the communication system 3 explained above are explained with reference to a sequence chart. FIG. 14 is a sequence chart diagram illustrating the operations of the communication system according to the third embodiment. This diagram illustrates only operations related to video/audio processing. Operations related to layout setting information processing are similar to those of the first embodiment (see FIG. 8A) and description thereof is omitted. Processing similar to that of the first and second embodiments is designated by a like step number and description thereof is omitted.

The video/audio terminals 130$_1$ to 130$_n$ transmit compressed video/audio signals to the multipoint connection apparatus 260 (Steps S11 and S12).

The multipoint connection apparatus 260 performs processing from Step S13 to Step S15.

Video audio signals are processed through a first channel of the multipoint connection apparatus 260. The combined-video/audio-signal generating unit 263 retrieves the layout setting information stored at Step S3 of FIG. 8A and combines the n video/audio signals based on the layout setting information (Step S41). The combined-video/audio-signal encoding unit 267 encodes the combined video/audio signal combined by the combined-video/audio-signal generating unit 263 (Step S42). The combined-video/audio-signal transmitting unit 271 transmits the compressed combined video/audio signal encoded by the combined-video/audio-signal encoding unit 267 to the video/audio terminal 130$_n$ (Step S43).

On the other hand, additional information is processed through a second channel of the multipoint connection apparatus 260. The additional-information generating unit 261 retrieves the layout setting information stored at Step S3 of FIG. 8A and generates additional information containing the layout setting information and the volume-level information (Step S44). The additional-information encoding unit 265 encodes the additional information generated by the additional-information generating unit 261 (Step S45). The additional-information transmitting unit 269 transmits the compressed additional information encoded by the additional-information encoding unit 265 to the video/audio terminal 130$_n$ (Step S46).

The video/audio signal is processed through a first channel of the video/audio terminal 130$_n$. The combined-video/audio-signal receiving unit 133 receives the compressed combined video/audio signal (Step S47). The combined-video/audio-signal decoding unit 137 decodes the compressed combined video/audio signal (Step S48).

On the other hand, the additional information is processed through a second channel of the video/audio terminal 130$_n$. The additional-information receiving unit 131 receives the compressed additional information (Step S49). The additional-information decoding unit 135 decodes the compressed additional information (Step S50). The volume-display-image generating unit 115 generates volume display images based on the volume-level information and the layout setting information contained in the decoded additional information (Step S33').

The video/audio combining unit 117 combines the combined video/audio signal decoded by the combined-video/audio-signal decoding unit 137 with the volume display images generated by the volume-display-image generating unit 115 (Step S34'). The obtained video/audio signals are displayed on the display unit (Step S22").

As described above, according to the present embodiment, the additional information and the video/audio signals are transmitted through the different channels. Accordingly, it is possible to transmit and receive the volume-level information without modifying the original video/audio signals.

In the first embodiment, a similar video is obtained irrespective of the configuration of the video/audio terminal; however, volume display can disadvantageously become redundant in such a case where the video/audio terminal includes a volume display unit of its own or the like. However, such a situation will not occur with the third embodiment because the video/audio terminal includes the volume-display-image generating unit and the video/audio combining unit.

According to the embodiments, volume levels are calculated from video/audio signals each transmitted from video/audio terminals respectively, volume display images are generated from the volume levels, and a signal into which the volume display images and the video/audio signals transmitted from the video/audio terminals are combined is generated. Accordingly, even when a multipoint conference is held by connecting three or more remote sites, each of the video/audio terminals can display microphone volume of the points separately.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

The invention claimed is:

1. A multipoint connection apparatus connected to a plurality of video/audio terminals, the multipoint connection apparatus comprising:
    circuitry configured to
        receive video/audio signals output from the video/audio terminals, respectively;
        calculate volume levels from the respective video/audio signals;
        generate volume display images indicating volume based on the calculated respective volume levels;
        receive pieces of layout setting information, each indicating information about arrangement of videos to be displayed on the corresponding video/audio terminal and being specified in advance;
        generate a combined video/audio signal for each of the video/audio terminals by combining video images and the volume display images based on the piece of layout setting information for the corresponding video/audio terminal, the video images corresponding to the video/audio signals and having been arranged based on the piece of layout setting information; and
        transmit the combined video/audio signal to the corresponding video/audio terminal.

2. The multipoint connection apparatus according to claim 1, wherein each of the volume levels is a maximum amplitude in a unit time of an audio signal.

3. The multipoint connection apparatus according to claim 1, wherein each of the volume levels is a root mean square in a unit time of an audio signal.

4. A communication system comprising:
    a multipoint connection apparatus; and
    a plurality of video/audio terminals, the multipoint connection apparatus and the video/audio terminals being connected to each other via a communication network,
    wherein
    the multipoint connection apparatus includes
        circuitry configured to
            receive video/audio signals output from the video/audio terminals, respectively;
            calculate volume levels from the respective video/audio signals;
            receive pieces of layout setting information, each indicating information about arrangement of videos to be displayed on the corresponding video/audio terminal and being specified in advance;
            generate a combined information signal for at least one of the video/audio terminals from video images corresponding to the video audio signals, the volume levels, and the piece of layout setting information for the corresponding video/audio terminal, the video images corresponding to the video/audio signals having been arranged based on the piece of layout setting information; and
            transmit the combined information signal to the corresponding video/audio terminal, and
    the at least one of the video/audio terminals includes
        circuitry configured to
            receive the combined information signal;
            generate volume display images indicating volume from the volume levels and the piece of layout setting information contained in the combined information signal; and
            combine the video/audio signals contained in the combined information signal with the volume display images.

5. The communication system according to claim 4, wherein each of the volume levels is a maximum amplitude in a unit time of an audio signal.

6. The communication system according to claim 4, wherein each of the volume levels is a root mean square in a unit time of an audio signal.

7. The communication system according to claim 4, wherein the combined information signal is a signal obtained by embedding the piece of layout setting information and the volume levels into the video/audio signals.

8. The communication system according to claim 4, wherein
    the combined information signal includes a combined video/audio signal into which the corresponding video/audio signals are combined based on the piece of layout setting information, and additional information made up of the piece of layout setting information and the volume levels,
    the circuitry of the multipoint connection apparatus outputs the combined video/audio signal through a first channel and outputs the additional information through a second channel, and
    the circuitry of the multipoint connection apparatus transmits to the corresponding video/audio terminal the combined video/audio signal through a first channel, and the additional information through a second channel, the circuitry of the at least one of the video/audio terminals receives the combined video/audio signal through the first channel, and receives the additional information through the second channel, the circuitry of the at least one of the video/audio terminals generates volume display images indicating volume from the additional information, and the circuitry of the at least one of the video/audio terminals combines the volume display images with the combined video/audio signal.

\* \* \* \* \*